United States Patent [19]

Kawashima

[11] Patent Number: 4,764,067

[45] Date of Patent: Aug. 16, 1988

[54] SCREW WITH GROOVE FOR SELF-LOCK AND METHOD AND ROLLING FLAT DIE FOR MANUFACTURING THE SAME

[75] Inventor: Masao Kawashima, Funabashi, Japan

[73] Assignee: JSM Screw Co., Ltd., Tokyo, Japan

[21] Appl. No.: 909,399

[22] Filed: Sep. 19, 1986

[30] Foreign Application Priority Data

Nov. 22, 1985 [JP] Japan .................. 60-263223
Jun. 25, 1986 [JP] Japan .................. 61-146797

[51] Int. Cl.⁴ ............................................. F16B 39/30
[52] U.S. Cl. ..................................... 411/310; 411/412
[58] Field of Search ................................. 411/308–311, 411/412; 10/86 A, 10 R

[56] References Cited

U.S. PATENT DOCUMENTS

| Re. 27,678 | 6/1973 | Orlomoski | 411/311 |
| 321,214 | 6/1885 | Harvey | 411/412 |
| 422,307 | 2/1890 | Libbey | 411/412 |
| 2,301,181 | 11/1942 | Ilsemann | 411/309 |
| 2,787,796 | 4/1957 | Rosan | 10/86 A |
| 2,788,046 | 4/1957 | Rosan | 411/311 |
| 3,813,718 | 6/1974 | Kamiya | 10/10 R |
| 3,850,215 | 11/1974 | Orlomoski | 411/311 |
| 3,882,917 | 5/1975 | Orlomoski | 411/309 |
| 3,939,512 | 2/1976 | Thurston et al. | 10/10 R |
| 4,252,168 | 2/1981 | Capuano | 411/311 |

FOREIGN PATENT DOCUMENTS 28008 2/1983 Japan .
7810988 5/1979 Netherlands .................. 411/411
867153 5/1961 United Kingdom ............. 10/10 R
923020 4/1963 United Kingdom ............. 10/10 R

*Primary Examiner*—Lloyd A. Gall
*Attorney, Agent, or Firm*—Jordan and Hamburg

[57] ABSTRACT

A self-locking screw has a longitudinal axis and comprises a thread having an inner radial portion and an outer radial portion, the inner radial portion having a pair of opposite first side faces defining a flank angle of the screw. The outer radial portion has a pair of opposite second side faces extending from the first side faces and first and second outer radial faces extending respectively from the pair of opposite second side faces. The thread has a central buffer groove having two groove side walls, the groove side walls along with the second side faces and the first and second outer radial faces defining two axial spaced elastically deformable thread portions which are elastically deformable such that as the thread is threaded onto a counterpart threaded member, the elastically deformable thread portions are engaged by the counterpart threaded member to cause elastic deformation as the thread portions axially approach one another and reduce the spacing between the thread portions. The inner radial portion of the thread is rigid to retain its initial configuration after having been threaded onto the threaded counterpart, whereby the outer and inner radial portions provide the elasticity and rigidity to obtain a high tightening force while resisting loosening thereof.

10 Claims, 11 Drawing Sheets

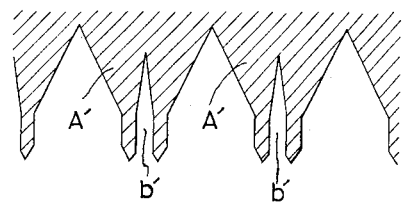
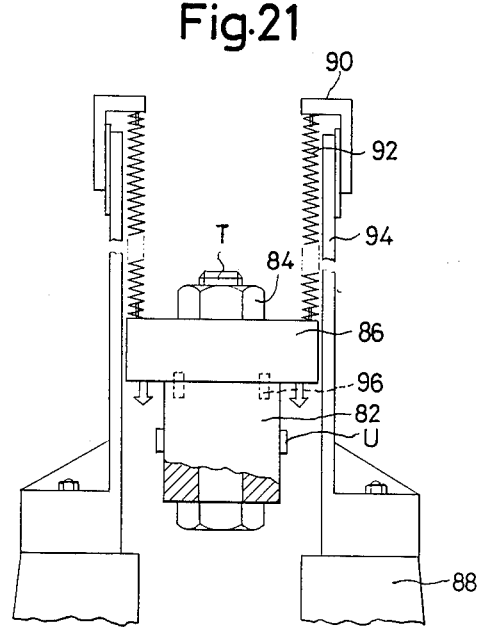

5000-TIME CONTINUOUS IMPACT TEST DATA

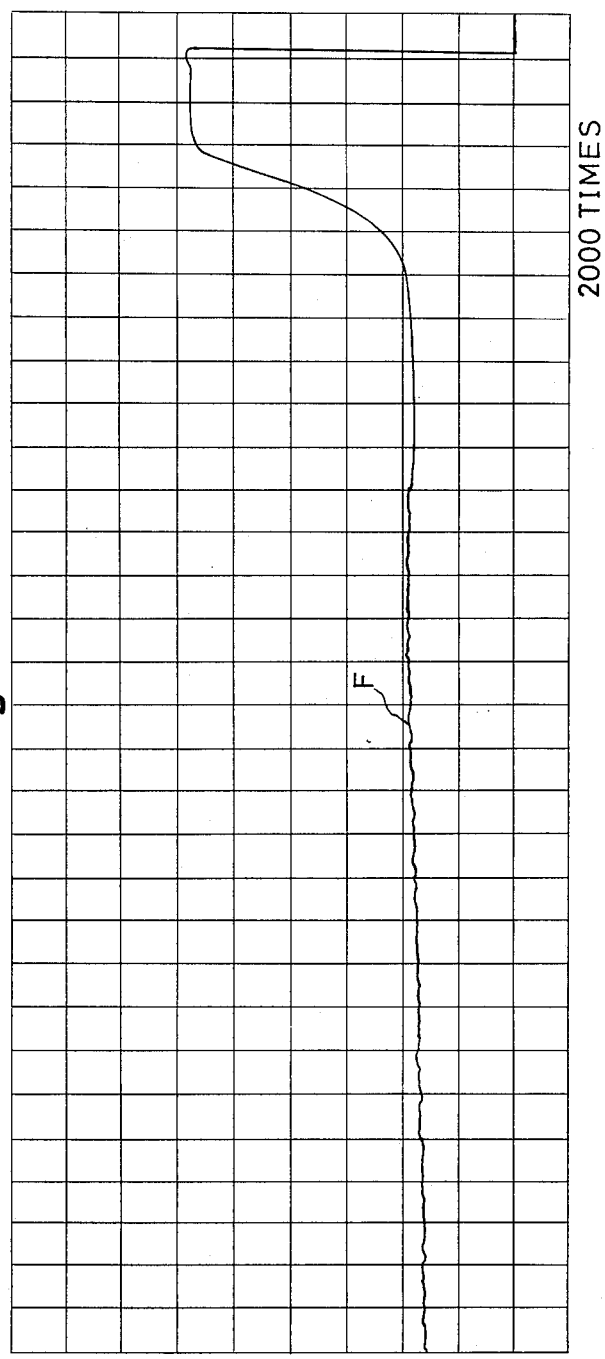

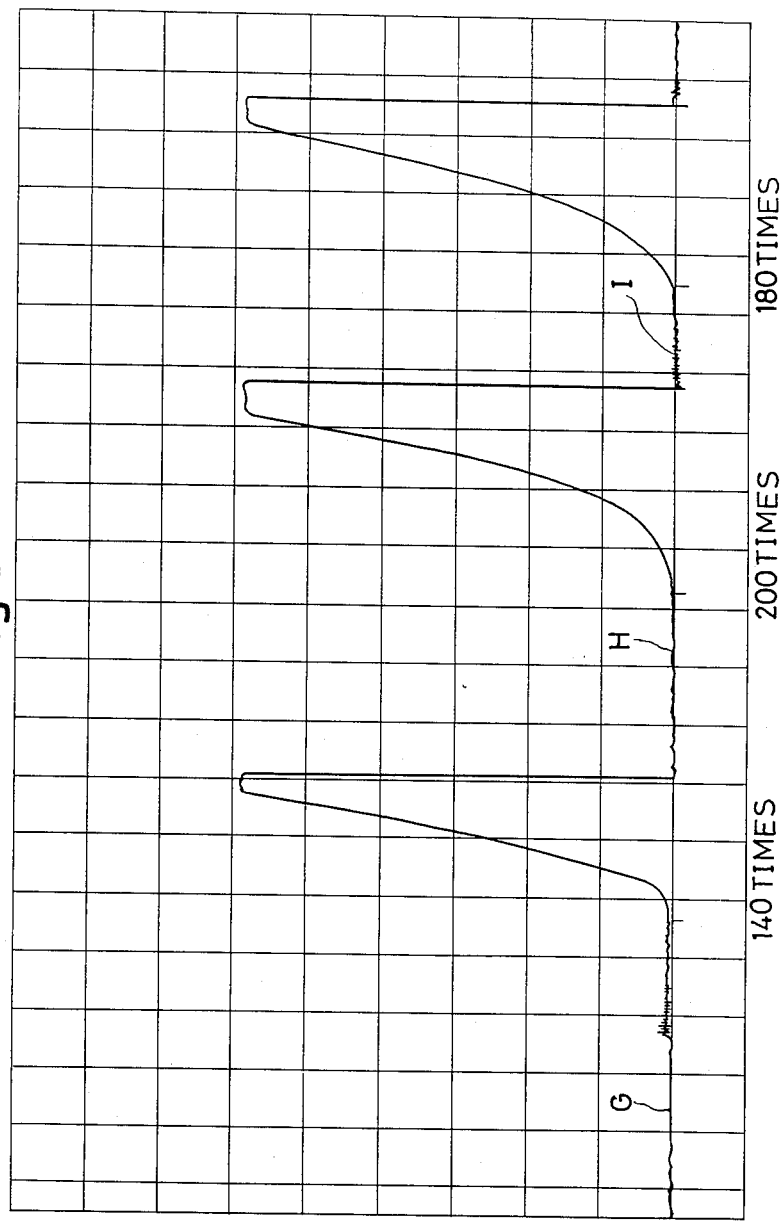

SCREW WITH GROOVE FOR SELF-LOCK AND METHOD AND ROLLING FLAT DIE FOR MANUFACTURING THE SAME

FIELD OF THE INVENTION

This invention relates to threaded articles such as bolts and nuts and, more particularly, to a screw with a groove for self-locking to prevent loosening after the screw has been tightened, and a method and rolling flat die used for manufacturing the same.

DESCRIPTION OF THE PRIOR ART

Well-known threaded articles of the self-locking type noted above are disclosed in Japanese Patent Publication No. 19492/1981, Japanese Patent Laid-Open No. 28008/1983 and Japanese Utility Model Laid-Open No. 58913/1985. These disclosed threaded articles of the self-locking type have a basic structure in which the thread has a groove cut in the radial direction from the top. With this structure, when male and female threaded members having different flank angles are screwed together, the portions of the thread facing each other on the opposite sides of the groove are elastically deformed by the urging force acting between the two threaded members, and an increase of the frictional resistance of the contact surfaces of the threads and a self-locking effect can be obtained owing to the elastic restoring produced at this time. This self-locking mechanism which depends on the sole elastic restoring force due to the elastic deformation of the facing portions, has a fatal drawback in that the self-locking effect is lost in the repeated use of the threaded member in case when the elastic restoring force of the facing portions on the opposite sides of the groove is reduced or when there occurs a plastic deformation.

SUMMARY OF THE INVENTION

The invention has been intended to overcome the above drawback, and its object is to provide a screw with a groove for self-locking, which can reliably maintain its self-locking function even when it is repeatedly used.

Another object of the invention is to provide a screw with a groove for self-locking, which can be readily manufactured by rolling die means.

A further object of the invention is to provide a screw with a groove for self-locking, which can provide a self-locking effect without need of any auxiliary part but by itself.

A still further object of the invention is to provide a method of manufacture of a screw with a groove of the self-locking type on a threaded article.

A yet further object of the invention is to provide a rolling flat die used for the manufacture of a screw with a groove of the self-locking type on a threaded article.

The above and other objects and features of the invention will become more apparent from the description of the invention with reference to the accompanying drawings.

BRIEF DESCRIPTION OF THE DRAWINGS

FIG. 20 is a fragmentary enlarged-scale sectional view showing the thread of a different screw with groove;

FIG. 21 is an elevational view, partly broken away, showing an impact looseness tester;

FIGS. 23 and 24 are graphs showing results of tests on a screw with groove and a commercially available bolt, with FIG. 23 being these on the screw with groove, and FIG. 24 being those on the commercially available bolt.

DESCRIPTION OF THE PREFERRED EMBODIMENTS

To attain the above objects of the invention, there is provided a screw with a groove for self-locking having a thread consisting of an upper portion and a lower portion in an axial section, the lower portion having opposite side surfaces a1 defining a flank angle of the screw, the upper portion having opposite side surfaces a2 which are substantially perpendicular to the axis of the screw, the upper portion having a buffer groove having a predetermined width and formed in the radial direction from a central portion of the top, the lower portion serving as a rigid thread portion with the side surfaces thereof in contact in a rigid state with a counterpart threaded member in a screwed relation to the counterpart thread member, the upper portion serving as an elastic thread portion such that its portions facing each other on the opposite sides of the buffer groove are elastically deformable in the direction of reducing the width of the buffer groove so that its opposite surfaces are in elastic contact with the counterpart threaded member, an effect of prevention of the looseness of the screw being thereby obtained by a combined effect of the rigid and elastic thread portions.

A separately prepared round rod is clampingly set between movement start ends of pair rolling flat dies, each of which has distinct front and rear portions in the direction of its progress, the front portion being formed on the inner side with a set of small parallel threads for preliminary processing inclined in coincidence with the helical lead angle of the screw and formed at a uniform pitch, the rear portion being formed on the inner side with a set of large parallel threads for finish processing formed as extensions of every other ones of and at twice the pitch of the small threads for preliminarily processing, and the two rolling flat dies are moved in opposite directions in a clamping relation to the round rod, thus effecting a first step of preliminarily forming the outer periphery of a rotating round rod with two continuous small threads having a predetermined pitch, and a second step, performed subsequent to the first step, for regularly forming a large thread in super-imposition on every other one of and at double the pitch of the two small threads, thereby forming a buffer groove in the top of the large thread with plastic deformation of the two small threads. In this way, the screw with groove for self-locking according to the invention is manufactured.

Now, specific examples of the mode of practice in connection with the screw with groove for self-locking according to the invention will be described in detail with reference to the drawings.

Figure 1:
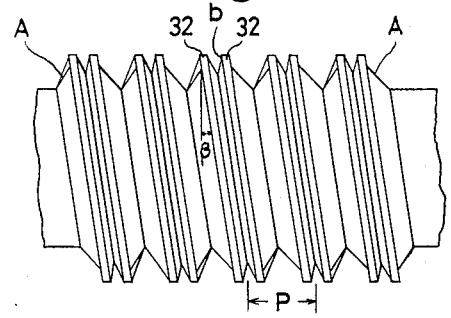
FIG. 1 is a side view showing a member with a male thread to illustrate a first embodiment of the screw with groove according to the invention.
Figure 2:
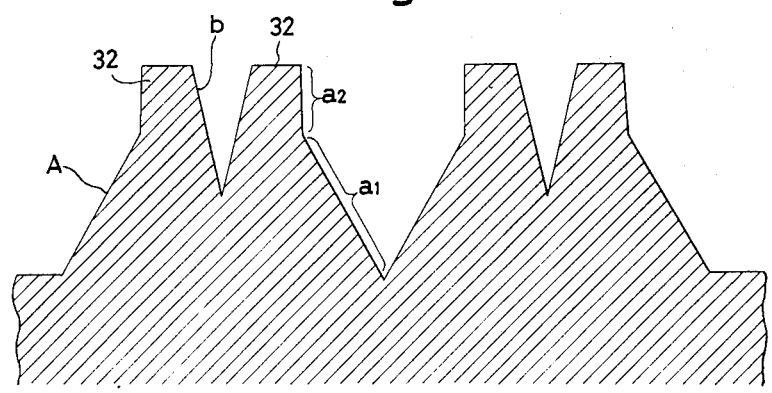
FIG. 2 is a sectional view, on an enlarged scale, showing an essential part of thread.
Figure 3:
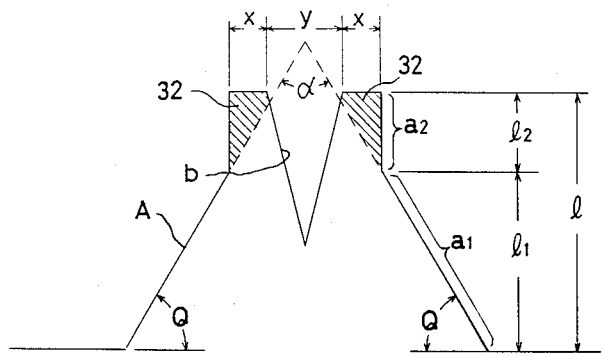
FIG. 3 is a view for explaining the shape and size of thread.

Referring to FIGS. 1 and 2, reference symbol A designates the thread of a male thread member made of metal. In its axial section, the thread A has a lower portion a1 and an upper portion a2. Of the two portions, the lower portion a1 has side surfaces defining the flank angle $\alpha$ of the thread as shown in FIG. 3. The upper portion a2 has opposite side surfaces substantially parallel to the radial direction. This portion has a buffer groove b of a V-shaped sectional profile cut in the radial direction from a central portion of the top. The upper portion a2 thus has opposite side portions 32 facing each other on the opposite sides of the groove b.

Dimensions of various parts of the thread of the male thread member are determined as follows.

The flank angle $\alpha$ and rise angle Q of the thread are determined in conformity with JIS or equivalent standards. The height l of the thread A is lower than the level of the apex of the flank angle.

In the illustrated example, the ratio of the heights l1 and l2 of the lower and upper portions a1 and a2 constituting the total height l of the thread A is set to be substantially 2:1. As for the opposite side portions 32 of the upper portion a2, defined by the V-shaped buffer groove b, their width x is related to the width y of the opening of the V-shaped buffer groove b such that $2x \leq y$, and $(2x+y)$ is set equal to one half the pitch.

Figure 4:
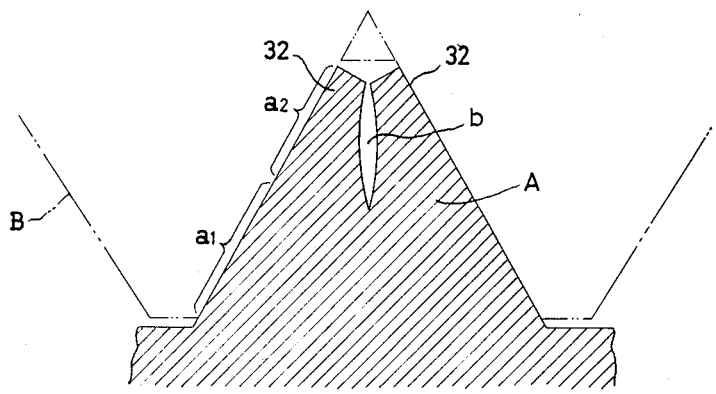
FIG. 4 is a sectional view showing the thread in a screwed state.
Figure 5:
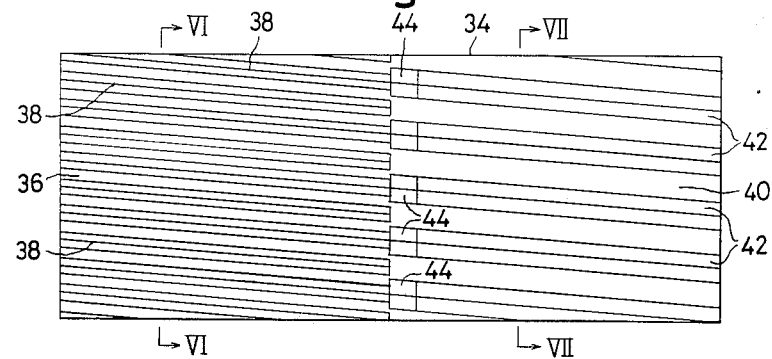
FIG. 5 is an internal elevational view showing a first embodiment of the rolling flat die according to the invention.
Figure 6:
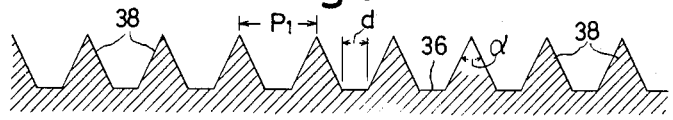
FIGS. 6 and 7 are fragmentary enlarged-scale sectional views taken along line VI—VI and VII—VII in FIG. 5.
Figure 7:
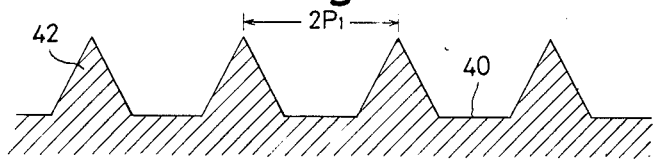

FIG. 4 shows the male thread member having the above construction in a state screwed in a female thread member. Designated at B is the thread of the female thread member.

In the operation of screwing together two threaded members, of the opposite side portions 32 of the upper portion a2 of the thread A of the male thread member, the portions of the outer side of the planes defining the flank angle $\alpha$, as shown shaded in FIG. 3, are urged in contact with the corresponding sides of the thread B of the counterpart female thread member when they are introduced into the gap with respect to the thread B. Therefore, the opposite side portions 32 on the opposite sides of the V-shaped buffer groove b are inwardly elastically deformed. At the end of the tightening, as shown in FIG. 4, the portions 32 are elastically deformed such that their side surfaces lie in the same planes as the side surfaces of the lower portion a1 and are urged together with the side surfaces of the lower portion a1 against the side surfaces of the thread of the male screw.

With the above structure of the male thread member, the lower and upper portions a1 and a2 of the thread A are both urged against the side surfaces of the thread of the counterpart threaded member, i.e., female thread member. At this time, the lower portion a1 acts as a rigid thread portion in contact in a rigid state with the counterpart threaded member, while the upper portion a2 acts as an elastic thread portion with the elastically deformed opposite side portions 32 in forced contact with an elastic restoring force with the counterpart threaded member. Thus, with respect to an axial compressive or tensile force, the lower portion a1 obtains a maximum area contact to produce a satisfactory frictional resistance owing to the flank angle coincident with the counterpart thread. With respect to a vibratory force, the upper portion a2 which is in forced contact with an elastic restoring force with the counterpart thread obtains a maximum area contact.

In other words, with the above construction of the male thread member the side surfaces of the thread effect a total area contact with the side surfaces of the counterpart thread when the two threaded members are screwed together, while the contact in the axial section is substantially the same as in the case of the thread of the prior art threaded member. Further, the lower portion a1 acting as rigid thread portion and upper portion a2 acting as elastic thread portion provide a combined stress against an external force. Thus, it is possible to obtain a high tightening force and hence an excellent looseness prevention effect can be obtained.

In the above embodiment the buffer groove b of the upper portion a2 has had a V-shaped sectional profile. However, it is possible to form a groove having a rectangular sectional profile as the buffer groove. Further, the buffer groove is desirably deep to such an extent that the rigidity of the lower portion a1 is not spoiled. This is advantageous from the standpoint of the elastic deformation.

Further, the groove should have an effective width of opening to permit elastic deformation of the opposite side portions 32.

Further, while the above embodiment has concerned with a male thread member, the same effects can be obtained when the invention is applied to a female thread member. Further the invention may be applied not only to metal screws but also plastic, ceramic material or wooden screws.

FIGS. 5 to 8 illustrate a first embodiment of the rolling flat die according to the invention, which is directly used for the manufacture of a screw with groove according to the invention.

The rolling flat die 34 of this embodiment has distinct front and rear portions in the direction of its progress at the time of operation. The front portion is formed on its inner clamping surface 36 with a set of parallel small threads 38 for preliminary processing inclined it coincidence with the helical lead angle $\beta$ of the thread A. These small threads 38 are formed at an uniform pitch P1 and with a predetermined distance d provided between adjacent ones. The rear portion is provided also on its inner clamping surface 40 with a set of parallel large threads 42 for finish processing as extensions of every other ones of and at twice the pitch 2P1 of the small threads 38.

The die 34 is made of a tool steel or a superhard alloy. The large threads 42 for finish processing have the same flank angle $\alpha$ as the small threads 38 for preliminary processing. In order to permit smooth progress from the small threads 38 which have a small height to the large threads 42 which have a large height, the large threads 42 are provided with a rising slope section 44 as a bridging portion adjacent to the small threads.

FIGS. 9 to 12 illustrate a second embodiment of the rolling flat die according to the invention.

The rolling flat die 46 of this embodiment, like the first embodiment has a set of parallel small threads 50 for preliminary processing on the inner clamping surface 48 of the front portion and a set of large threads for finish processing on the inner clamping surface 52 of the rear portion. In this embodiment, however the threads 50 and 54 are formed closely, i.e., without any distance provided between adjacent ones of them. In addition, the inner clamping surface 52 of the rear portion is stepped down with respect to the inner clamping surface 48 of the front portion such that the tops 50' and 54' of the small and large threads 50 and 54 are flush with one another.

Figure 13:
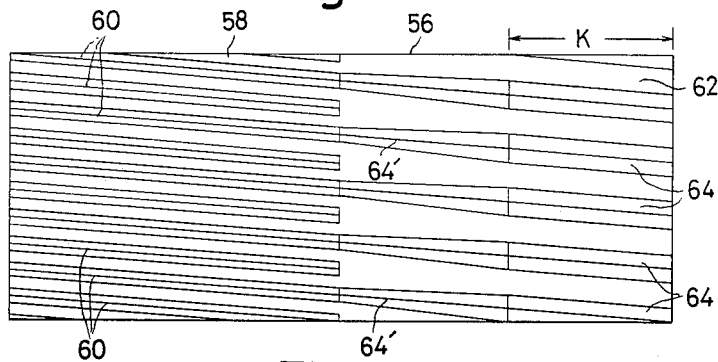
FIGS. 13 and 14 are an elevational view and a plan view, respectively, showing a third embodiment of the rolling flat die according to the invention.
Figure 14:
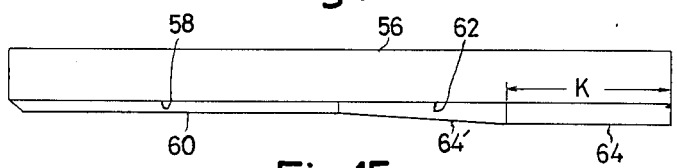

FIGS. 13 and 14 illustrate a third embodiment of the rolling flat die according to the invention. In the die 56 of this embodiment, parallel small threads 60 for preliminary processing on the inner clamping surface 58 of the front portion have a constant height, but parallel large threads 64 for finish processing on the inner clamping surface 62 of the rear portion have an inclined sectional profile section 64' with the height thereof progressively increased from the height of the small threads 60 for preliminary processing to a maximum height at a position ahead of the other end by a distance at least equal to the length K of circumference of round rod Y as workpiece.

Figure 15:
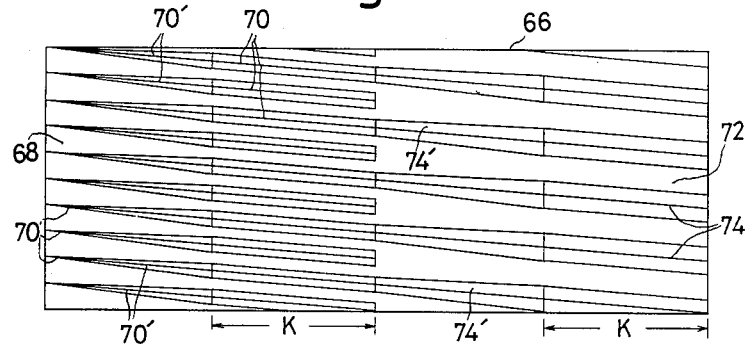
FIGS. 15 and 16 are an internal elevational view and a plan view, respectively, showing a fourth embodiment of the rolling flat die according to the invention.
Figure 16:
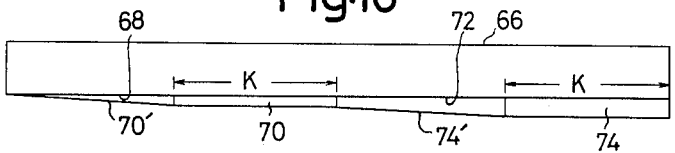

FIGS. 15 and 16 illustrate a fourth embodiment of the rolling flat die according to the invention. In the die 66 of this embodiment, small threads for preliminary processing on the inner clamping surface 68 of the front portion has an inclined sectional profile section 70' with the height thereof being zero at the start end in the direction of progress of the die and progressively increased up to a position ahead of the other end by a distance at least equal to the length K of circumference of the round rod Y. Also, large threads 74 for finish processing on the inner clamping surface 72 of the rear portion has an inclined sectional profile 74' have an inclined sectional profile section 74' with the height thereof progressively increased from the end adjacent to the small threads 70 for preliminary processing up to a position ahead of the other end by a distance at least equal to the length K of the round rod Y.

Figure 8:
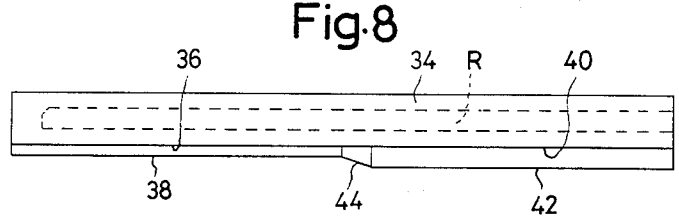
FIG. 8 is a plan view showing the first embodiment of the rolling flat die according to the invention.
Figure 9:
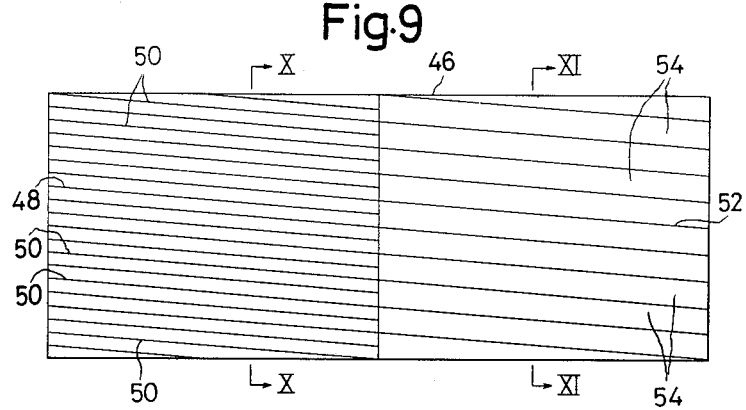
FIG. 9 is an internal elevational view showing a second embodiment of the rolling flat die according to the invention.
Figure 10:
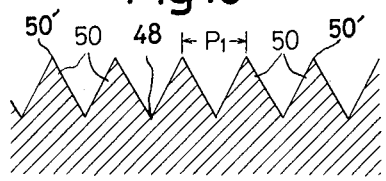
FIGS. 10 and 11 are fragmentary enlarged-scaled sectional views taken along line X—X and XI—XI in FIG. 9.
Figure 11:
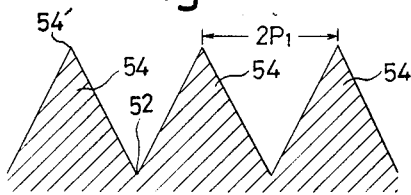
Figure 12:
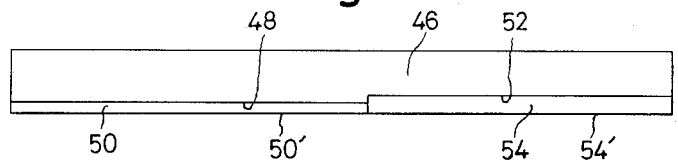
FIG. 12 is a plan view showing the second embodiment of the rolling flat die according to the invention.

FIG. 8 shows a further embodiment of the rolling flat die according to the invention, in which the die 34 has a heater accommodation bore or cooling bore R.

Figure 18:
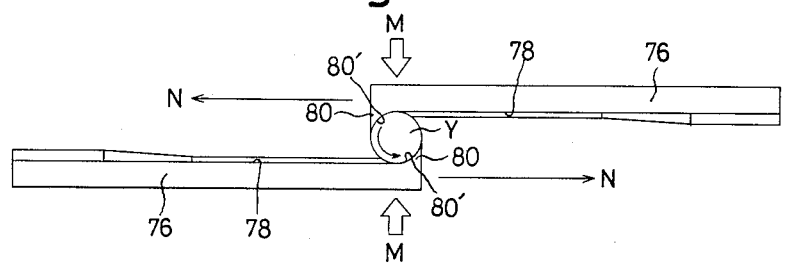

FIG. 18 shows a further embodiment of the rolling flat die 76 according to the invention. The die 76 of this embodiment has a round rod reception seat 80 provided at the start end of the inner clamping surface 78 of the front portion.

Figure 17:
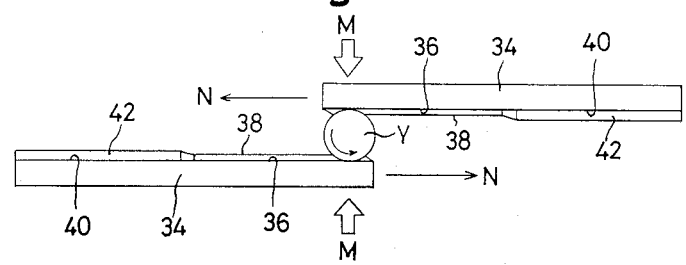
FIGS. 17 and 18 are views illustrating an embodiment of the method of manufacture according to the invention.

Now, a method of manufacturing a screw with groove using a pair of rolling dies according to the invention will be described with reference to FIG. 17.

Figure 19:
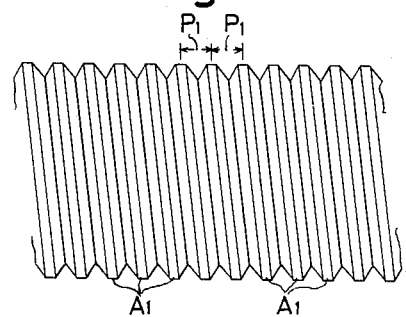
FIG. 19 is a view showing small threads of preliminary processing formed on the outer periphery of a round rod in a first step of a first embodiment of the method of manufacture according to the invention.
Figure 22A:
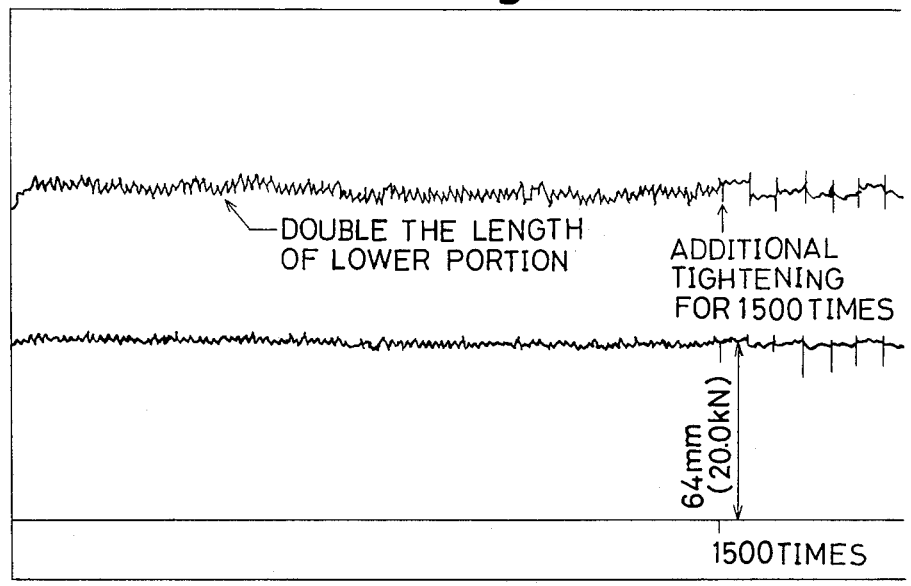
FIGS. 22(a) to 22(d) are graphs showing impact looseness test characteristics of a screw with groove.
Figure 22C:
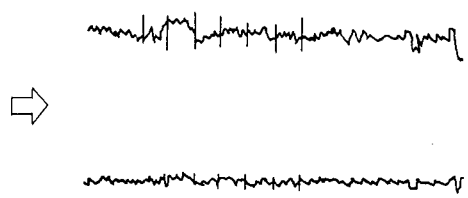
Figure 22B:
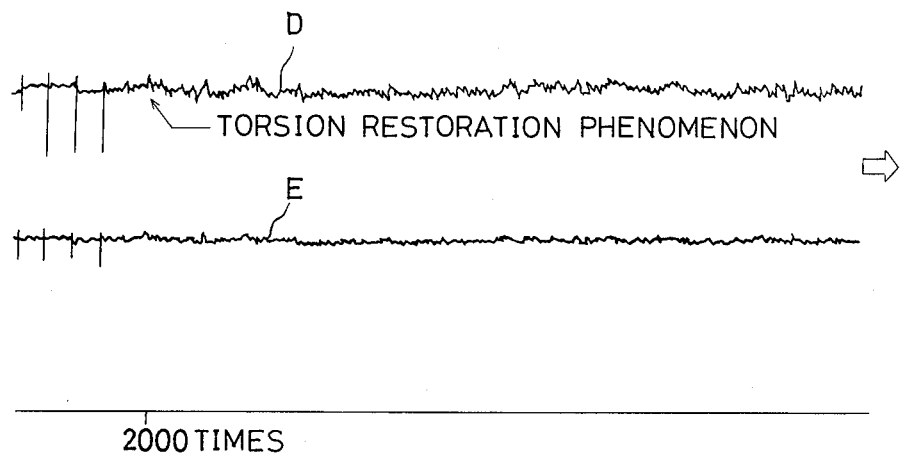
Figure 22D:
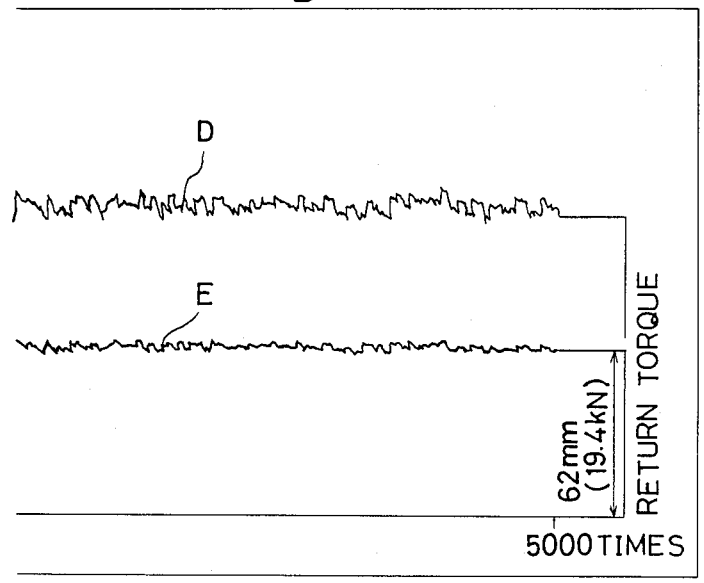

First, the two rolling dies are disposed in a vertical or horizontal symmetrical arrangement such that their start ends face each other. Then, a metal round rod Y which is separately prepared is set in a clamped state between the facing ends of the dies, i.e., start ends of small threads 38 for preliminary processing on the facing inner clamping surfaces 36 of the front portions of the dies 34. In this state, a pressure is applied to the system from the opposite sides as shown by arrows M. Then the dies 34 are moved in opposite directions as shown by arrows N. In consequence, there are effected a first step, in which the outer periphery of the round rod Y forcively rotated in the counterclockwise direction shown by arrow is preliminarily formed with two continuous small threads A1 having a predetermined pitch P1, as shown in FIG. 19, as the round rod Y is rolled between the small threads 38 for preliminary processing on the inner clamping surfaces 36 of the front portions of the two dies 34, and a second step, which is effected immediately after the first step, and in which a large thread A is formed regularly in superimposition on every other one of and at double the pitch $2P1 = P$ of the two small thread A1 as the round rod is rolled between the large threads 42 for finish processing on the inner clamping surfaces 40 of the rear portions of the dies 34. In this way, a screw with groove for self-locking as shown in FIG. 1 can be obtained, which has an elastically deformable buffer groove b formed on the central portion of the top of the large thread A with plastic deformation of the two small threads A1.

Where a pair of dies 46 are used, a screw with groove for self-locking as shown in FIG. 20 can be obtained, which has a buffer groove b' formed in a central portion of the top of the large thread A'.

Where a pair of dies 76 as shown in FIG. 18 are used, the metal round rod Y can be readily set either from above or sidewise to be between arcuate facing surfaces 80' of the round rod reception seats 80 which have a projecting form.

When the rolling die is used continuously, seizure or the like is liable to result. Therefore, cooling water or like cooling medium is circulated through the cooling bore R during the operation of the die to prevent the temperature thereof from rising beyond a predetermined temperature.

Further, where the round rod Y is made of a thermoplastic or thermosetting engineering plastic material, it is necessary to heat the rolling flat die up to a thermoplastic or thermosetting temperature with a heater (not shown) accommodated in the heater accommodation bore R of the die.

Further, the round rod Y may be made of a ceramic material before firing.

As has been described in the foregoing, the screw with groove for self-locking according to the invention has a thread consisting of an upper portion and a lower portion in an axial section, with the lower portion having opposite side surfaces defining a flank angle of the screw and with the upper portion having opposite side surfaces substantially parallel to the radial direction, the upper portion having a buffer groove having a predetermined width and formed in the radial direction from a central portion of the top. Thus, the lower portion serves as a rigid thread portion with the side surfaces thereof in contact in a rigid state with a counterpart threaded member in a screwed relation to the counterpart threaded member, while the upper portion serves as an elastic thread portion such that its portions facing each other on the opposite sides of the buffer groove are elastically deformable in the direction of reducing the width of the buffer groove so that its opposite surfaces are in elastic contact with the counterpart threaded member. Thus, it is possible to obtain an excellent looseness prevention effect of the screw with combined actions of the rigid and elastic thread portions noted above.

Since the method of manufacturing a screw with groove using the rolling flat dies according to the invention consists of the continuous first and second steps, a time for prearrangements can be reduced, which is desired from the mass production standpoint.

By way of example, it is possible to obtain mass production of 50 to 120 products per minute with a product precision of about class 2.

An impact looseness test conducted on a screw with groove (hereinafter referred to as sample bolt) manufactured by the method according to the invention using the rolling flat dies according to the invention will now be described.

(1) Test method a. The sample bolt used was equivalent to M10 with an outer diameter of 9.30 mm and a hardness of 290 HV. The sample nut used was of 7H (class 3) with an inner diameter of 8.60 mm, an effective diameter of 9.21 mm and a hardness of 237 HV.

b. Impact looseness tester:

FIG. 21 shows the construction of the main part of the impact looseness tester. Referring to the Figure, the head of the sample bolt T is secured to a lower cylinder 82, and an upper nut 84 is tightened, thus forming a screwed system. This screwed system is allowed to fall, i.e., an upper cylinder 86 is caused to strike a bed 88.

As a result of the impact, a tensile impact force is produced in the lower cylinder 82. A compressive impact force which is generated on the contact surface of the thread A due to propagation of an impact stress wave, is detected by a strain gauge U mounted on the lower cylinder 82. The force which has to relate with the looseness of the screw is the compressive impact force.

Reference numeral 90 in the Figure designates a spring retainer, numeral 92 a tension coil spring, numeral 94 a guide cylinder, and numeral 96 a pin.

c. The test was conducted by applying #60 spindle oil to the threaded surfaces of sample bolt T and nut 84 and nut washer surfaces. The tensile impact force was set to a constant value, and the number of times of striking of the screwed system and axial force exerted to the bolt were measured.

(2) Results and considerations

FIGS. 22a to 22d show 5,000-time continuous impact test data, i.e., impact looseness test characteristic graphs D and E. An average value of data measured with 42 sample bolts were obtained. As shown in FIGS. 22a to 22d, the initial axial force was set to 21.5 KN, and additional tightening was done after 1,500 times the striking.

The average axial force at this time was 20.97 KN, and a phenomenon of restoration from twist could be seen from 1,500-th to 2,000-th strikings. The axial force was substantially constant at the last, i.e., 5,000-th, striking. The average axial force at the 5,000-th striking was 20.01 KN. The difference between the axial force between the instant of additional tightening and the last striking was 0.96 KN. It will be seen that 95% of the axial force at the time of the additional tightening remainded at the last striking.

FIGS. 23 and 24 show results of comparison of impact looseness tests on a sample bolt and a commercially available bolt.

FIG. 23 shows an impact looseness characteristic graph F of the sample bolt. The axial force on relief bolt, SCM cap and SKS 305 nut suddenly increased at the 2000-th striking to 1,300 kgf and 600 kg/cm$^2$ and it is reduced to zero, that is, complete loosening is resulted, when the return torque is increased to 100 kg/cm$^2$.

FIG. 24 shows impact looseness characteristic graphs G, H and I of commercially available bolts. In the case of the graph G, the axial force on relief bolt, SCM cap and SKS 305 nut, and flat washer is suddenly increased to 1,300 kgf in 16 strikings subsequent to the 140-th striking, and it is reduced to zero to result in complete loosening when the return torque is increased to 250 kg/cm$^2$. In the case of the graph H, the axial force on relief bolt, SCM cap, SKS nut and washer is suddenly increased to 1,300 kgf in 25 strikings subsequent to the 200-th striking, and it is reduced to zero to result in complete loosening when the return torque is increased to 280 kg/cm$^2$. In the case of the graph I the axial force on relief volt, SCM cap, SKS 305 nut and washer is increased to 1,300 kgf in 25 strikings subsequent to the 180-th striking, and it is reduced to zero to result in complete loosening when the return torque is increased to 280 kg/cm$^2$.

It is made obvious from the above comparison that the sample bolt has over 10 times the impact looseness resistance of the commercially available bolts.

What is claimed is:

1. A self-locking screw having a longitudinal axis and comprising a thread having an inner radial portion and an outer radial portion, said inner radial portion having a pair of opposite first side faces defining a flank angle of said screw, said first side faces each being disposed at an acute angle relative to said axis, said outer radial portion having a pair of opposite second side faces extending from said first side faces, said outer radial portion also having first and second outer radial faces extending respectively from said pair of opposite second side faces, said pair of second side faces being generally planar surfaces which are parallel to one another and which are perpendicular to said axis, said pair of second side faces having outer radial terminating ends, said first and second outer radial faces extending from said terminating ends and being disposed generally parallel to said axis, said thread having a central groove means defined by a radially inwardly extending buffer groove having two groove side walls and a bottom juncture means joining said two groove side walls at the innermost radial end of said two groove side walls, said two groove side walls each having an outer radial terminating end joined respectively to said first and second outer radial faces such that said two groove side walls extend generally radially inwardly from said first and second outer radial faces, said two groove side walls along with said second side faces and said first and second outer radial faces defining two axially spaced elastically deformable thread portions which are elastically deformable such that as said thread is threaded onto a counterpart threaded member, said elastically deformable thread portions are engaged by said counterpart threaded member and elastically deformed as said thread portions axially approach one another and reduce said axial spacing between said thread portions, said inner radial portion of said thread being rigid to retain its initial configuration after having been threaded onto said threaded counterpart, whereby said outer and inner radial portions provide the elasticity and rigidity to obtain a high tightening force while resisting loosening thereof.

2. A self-locking screw according to claim 1, wherein said central groove means defines a buffer groove having a generally V-shaped configuration, said bottom juncture means being defined by the apex of the V-shaped configuration where said two groove side walls are joined.

3. A self-locking screw according to claim 1, wherein said buffer groove has an axial length defined as the axial distance between said two outer radial terminating ends of said two groove side walls, said axial length of said buffer groove plus the axial length of said first and second outer radial faces being substantially equal to one-half the pitch of said thread.

4. A self-locking screw according to claim 1, wherein said buffer groove has an axial length defined as the axial distance between said two outer radial terminating ends of said groove side walls, said axial length of said buffer groove being equal to or greater than the combined axial length of said first and second outer radial faces.

5. A self-locking screw according to claim 4, wherein the axial length of said first and second outer radial faces are substantially equal to one another.

6. A self-locking screw according to claim 1, wherein said pair of opposite first side faces defining said flank angle of said inner radial portion of said thread intersects at an imaginary intersection spaced radially outwardly of said axis, said first and second outer radial faces being spaced radially inwardly from said intersection.

7. A self-locking screw according to claim 1, wherein said inner radial portion has a radial depth measured perpendicular to said axis which is about twice the radial depth of said outer radial portion measured perpendicular to said axis.

8. A self-locking screw according to claim 1, wherein said buffer groove extends radially inwardly into said inner radial portion.

9. A self-locking screw according to claim 1, wherein said pair of second side faces are disposed at an acute angle relative to said axis and substantially equal to said acute angle of said first side faces while being generally planar with the respective pair of said first side surfaces after said elastic deformation effected by said engagement with said counterpart threaded member.

10. A self-locking screw according to claim 1, wherein before said elastic deformation, each of said two groove side walls have a linear configuration in a longitudinal extending diametrical cutting plane, each of said two groove side walls having an arcuate configuration in a longitudinal diametrical cutting plane after said elastic deformation effected by said engagement with said counterpart threaded member.

* * * * *